United States Patent [19]

Liljegren

[11] 4,280,906
[45] Jul. 28, 1981

[54] FILTER FOR SEPARATING SOLID CONTAMINANTS FROM A FLUID, ESPECIALLY SOLID CONTAMINANTS IN A REACTOR COOLING WATER USED IN NUCLEAR REACTOR PLANTS

[75] Inventor: Lennart Liljegren, Vesteras, Sweden

[73] Assignee: AB Asea-Atom, Vesteras, Sweden

[21] Appl. No.: 96,305

[22] Filed: Nov. 21, 1979

[51] Int. Cl.³ .............................................. B01D 27/02
[52] U.S. Cl. .................................... 210/282; 210/335
[58] Field of Search ............... 210/281, 282, 284, 287, 210/289, 335, 339, 446, 451, 452, 454, 500 R

[56] References Cited

U.S. PATENT DOCUMENTS

| | | | |
|---|---|---|---|
| 1,774,232 | 8/1930 | Hartwell | 210/500 R |
| 2,370,190 | 2/1945 | Ralston | 210/335 |
| 2,587,903 | 3/1952 | Rood | 210/451 |
| 2,593,227 | 4/1952 | Wagner | 210/335 |
| 2,630,227 | 3/1953 | Rodwell | 210/282 |

Primary Examiner—Ivars C. Cintins
Attorney, Agent, or Firm—Watson, Cole, Grindle & Watson

[57] ABSTRACT

A cartridge-type filter has easily exchangeable and safe distance handling filter cartridges contaminated with radiation-emitting contaminants. The filter includes a filter housing having an inner annular shoulder forming a valve seat, and a filter cartridge has an outer ring in sealing engagement with the shoulder for both supporting the cartridge and dividing the filter housing into two separate chambers respectively in communication with the supply and return conduits provided on the housing. A portion of the reactor cooling water is conducted continuously through the filter circuit which is parallel to the main water flow.

9 Claims, 6 Drawing Figures

FILTER FOR SEPARATING SOLID CONTAMINANTS FROM A FLUID, ESPECIALLY SOLID CONTAMINANTS IN A REACTOR COOLING WATER USED IN NUCLEAR REACTOR PLANTS

BACKGROUND OF THE INVENTION

This invention relates generally to a cartridge-type filter for separating contaminants in a fluid, and more particularly to such a filter for separating solid contaminants in the circulating cooling water of a nuclear power plant.

Chemical attacks in nuclear power plants lead to the formation of oxides or other substances on the surface of various structural elements as, for example, on the inner surface of the reactor vessel, in conduits or on the surface of components included in the reactor core. Further, flow and abrasion result in the loosening of various machine elements, such as valves, pumps, etc.

Because the contaminants are formed and circulate in an environment with high radioactivity, radioactive isotopes are formed in the particulate material. For example, a radioactive isotope Co 60 may be formed from an alloy such as cobalt. Thus, the filter containing a considerable quantity of separated material is highly radioactive so that the handling of it involves special problems because of the radiation emitted by the filter material. The filter must thus be surrounded by radiation protectors, and the removal and exchange of filter material must take place via remote operation.

SUMMARY OF THE INVENTION

It is an object of the present invention to provide a filter wherein exchange and removal of the filter material may be simply carried out in an effective and efficient manner despite its high level of radiation.

The filter according to the invention is of a cartridge filter-type in which a filter cartridge can be easily installed or removed from a filter housing by simple remote control means. The filter housing has a top opening and a lid which covers the opening, and the lid is capable of being connected to one of several interconnected filter cartridges which contain filter material for separating contaminants, primarily solid particles, present in the cooling water of the reactor. The cartridge filter may include a plurality of filter housings which are suitably cylindrical and are vertically disposed. Each filter housing has an inner, annular flange or shoulder defining a valve seat and serving to support the filter cartridges. One of the filter cartridges has an outer, annular seal ring in sealing engagement with the shoulder for supporting the filter cartridge within the housing and for dividing the housing into two separate chambers respectively in communication with supply and return conduits provided on the housing above and below the seal ring. Foul water is supplied to the upper chamber and the filtered water is collected in the lower chamber and is returned to the reactor vessel. The filter is suitably included in a circuit parallel to the main water flow of the reactor with only a minor portion of the flow passing through this cleaning circuit.

Several filter cartridges may be located in one filter housing and, the cartridges may be series- or parallel-connected connected. Also, several filter housings may be included in one filter group with the housings being either parallel- or series-connected. The filter material contained within the filter cartridges may be located between strainers provided at the inlet and outlet sides of each cartridge so that the foul water will pass axially through the filter bed between the strainers. Or, each cartridge may have two concentric, annular gap strainers between which an annular filter bed is located, through which the foul water flows radially. The filter bed material, used in either of these constructions, may be comprised of metal wire clippings. A filter cartridge within the housing may be joined to the lid covering the top opening such that when the lid is removed, the cartridge or cartridges are lifted together therewith. And, to increase the sealing engagement between the seal ring and the shoulder in the filter housing, springs may be provided between the lid and the filter cartridge.

Other objects, advantages and novel features of the invention will become more apparent from the following detailed description of the invention when taken in conjunction with the accompanying drawings.

DETAILED DESCRIPTION OF THE INVENTION

Figure 1:
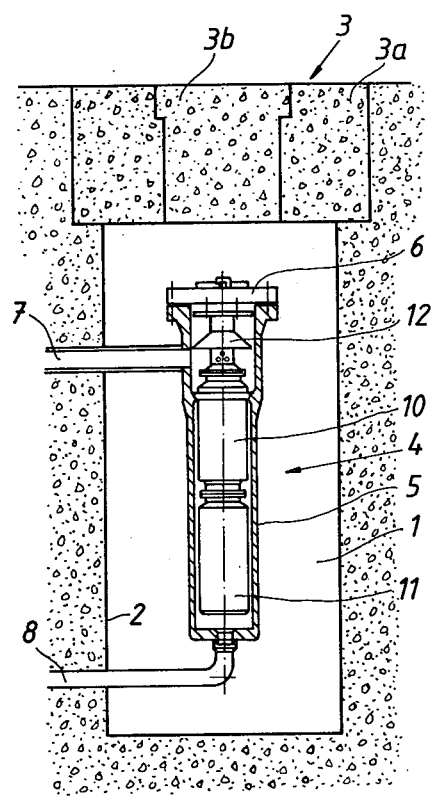
FIG. 1 is a vertical sectional view of the filter according to the invention as positioned in a nuclear power plant.
Figure 2:
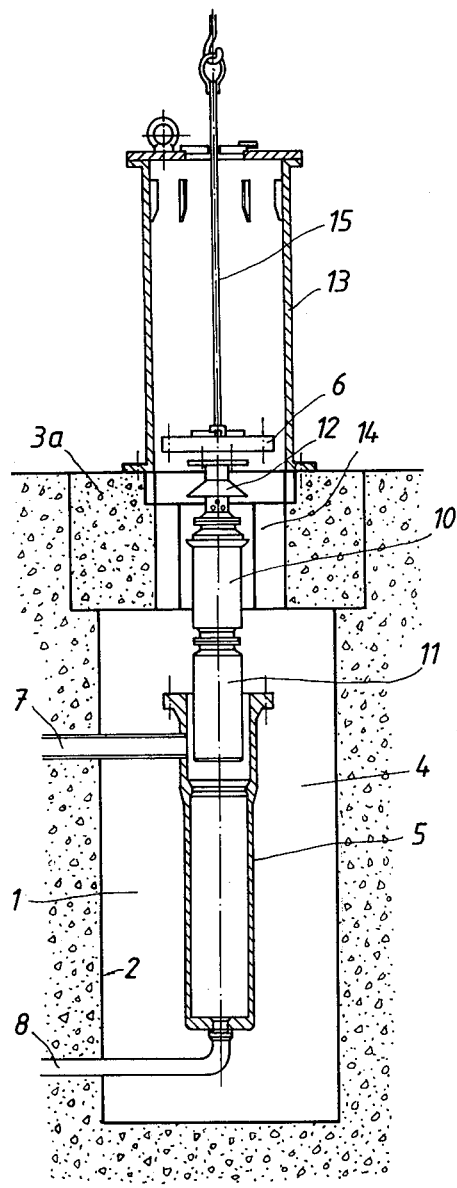
FIG. 2 is a view similar to FIG. 1 showing the manner of removing the filter cartridges.

A portion of a nuclear power plant needed to describe the invention is shown in FIG. 1 as including a space 1 defined by concrete walls 2 and a closing lid 3 which includes an outer annular section 3a and an inner plug 3b. A cartridge filter unit according to the invention, generally designated 4, is located in space 1 and comprises a cylindrical filter housing 5 having a top opening covered by a detachable lid 6 attached to the housing by bolts 9. The filter housing is connected to the primary cooling water system of a reactor (not shown) by a supply conduit 7 for receiving the foul water to be cleaned and by a return conduit 8 for returning the cleaned water. Since filter unit 4 communicates with the primary cooling system of the reactor, the filter unit must be constructed to withstand the same pressure existing in the system, i.e., usually about 70 bar in a boiling reactor. It may also be suitable to adapt the filter unit to the steam pressure system, which is about 300° C. Two filter cartridges 10 and 11 are mounted in the filter housing, upper cartridge 10 being connected to an inlet portion 12 for control of the direction of the water flow at the inlet end of this cartridge. The cartridges are interconnected, as in a manner to be later described, and inlet portion 12 interconnects lid 6 with cartridge 10 so that cartridges 10 and 11 may be removed upon the removal of lid 6 as shown in FIG. 2. During such removal operation, concrete plug 3b is removed and a radiation protection device 13 is mounted on lid 3a over opening 14 defined by the removal of the plug. A rod 15 is connected to lid 6 and the entire unit comprising lid 6, inlet portion 12 and cartridges 10,11 are lifted up into device 13 by means of a suitable hoisting device. Radiation protection device 13 together with its contents is then removed, cartridges 10 and 11 and inlet portion 12 are separated, whereafter cartridges 10 and 11 may be cast into concrete or deposited in any conventional manner.

Figure 3:
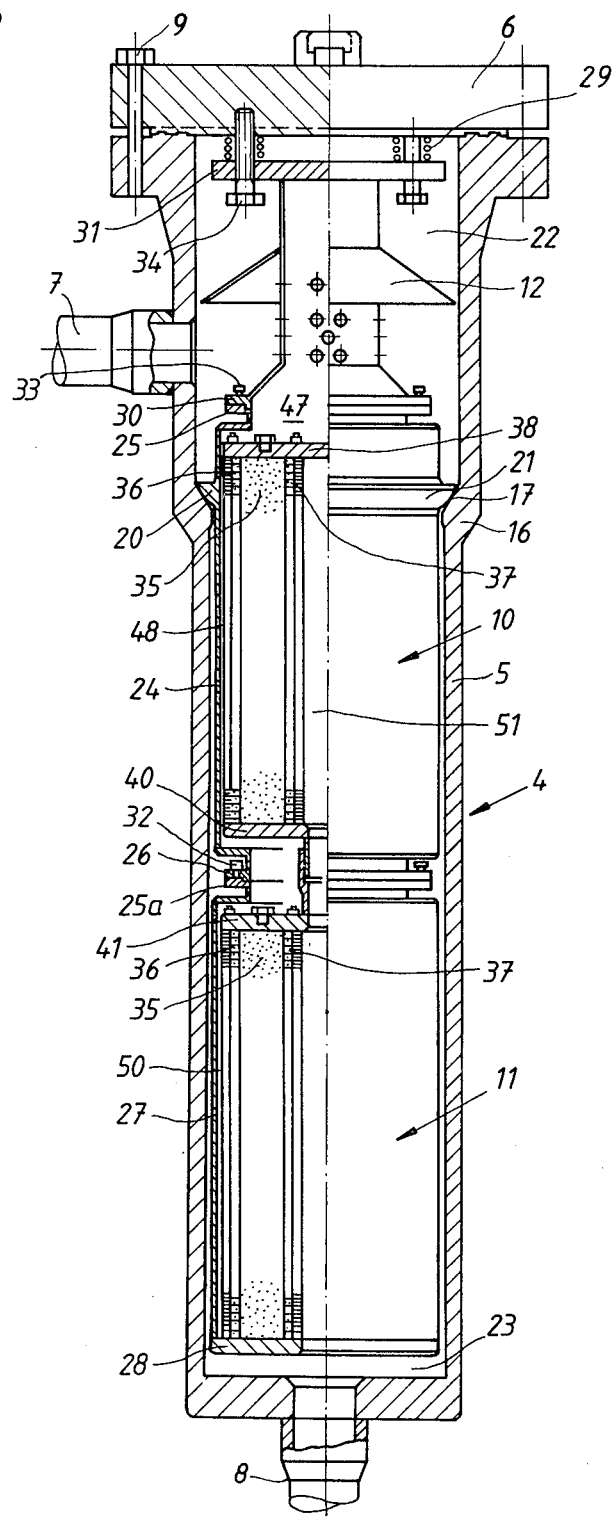
FIGS. 3 and 4 are vertical sectional views of the FIG. 1 filter, at enlarged scale, of two embodiments according to the invention.
Figure 4:
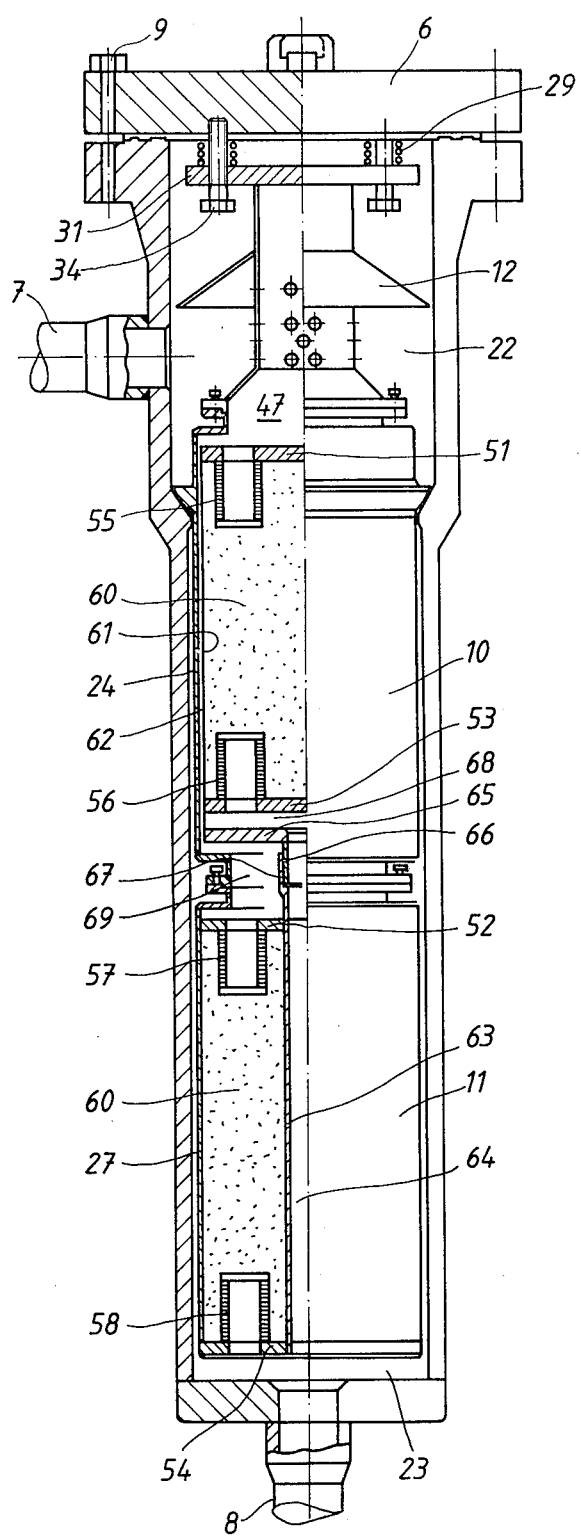
Figure 5:
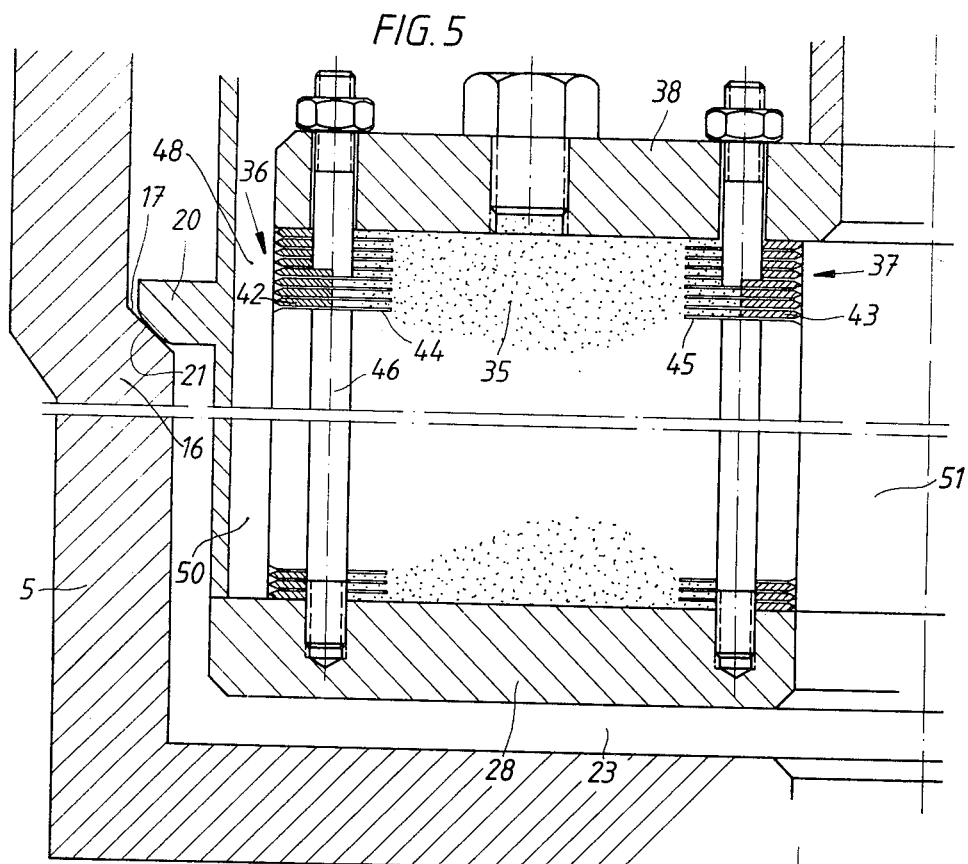
FIG. 5 is a detail view in vertical section at an even larger scale of a portion of the FIG. 3 embodiment.

As shown in FIGS. 3, 4, and 5, the upper portion of filter housing 5 has a larger diameter than its lower portion. An annular shoulder 16 is formed at the transition between the larger and smaller diameters, such shoulder or flange having a conical surface 17 defining a valve seat. Upper cartridge 10 has a seal ring 20 thereon of substantially spherical shape as at 21 for sealingly engaging with surface 17 to thereby divide the filter housing into two separate upper and lower chambers 22 and 23 which are sealed against intercommunication. The upper and lower chambers respectively communicate with the supply and return conduits 7 and 8.

Thus, interconnected cartridges 10 and 11 are suspended from ring 20 in engagement with shoulder 16. Upper cartridge 10 includes a sleeve 24 spaced inwardly from the inner surface of the filter housing and having radially extending flanges 25 and 26 at opposite ends. Lower cartridge 11 includes a similar sleeve 27 slightly spaced inwardly from the inner surface of the filter housing and having a radially extending flange 25a at its upper end and an annular bottom wall 28. Inlet portion 12 is provided with flanges 30 and 31 at its opposite ends, and cartridges 10 and 11 are interconnected by bolts 32. Inlet portion 12 and cartridge 10 are interconnected by bolts 33, and the inlet portion is connected to lid 6 by bolts 34 extending through plate 31 and into the lid. Bolts 32 and 33 may be welded to flanges 25 and 25a, and flanges 26 and 30 may be provided with openings for the bolt heads and slots for the bolt shanks so that the bolt heads may be inserted through the openings whereafter the cartridges are turned so that the bolt shanks are moved into the slots to thereby form a bayonet-type connection.

Coil springs 29 are located between lid 6 and plate 31 for resiliently biasing the entire cartridge unit with an increased force against surface 17 to thereby increase the seal between surfaces 21 and 17. Filter material 35, which may be in the form of metal wire chips or trimmings, lies between two annular concentric strainers 36 and 37 and between closing plate 38 at the upper end of cartridge 10 and lower ring 40 of this cartridge. Similar filter material is located between two annular concentric strainers 36 and 37 and between upper and lower rings 41 and 28 of lower cartridge 11.

Figure 6:
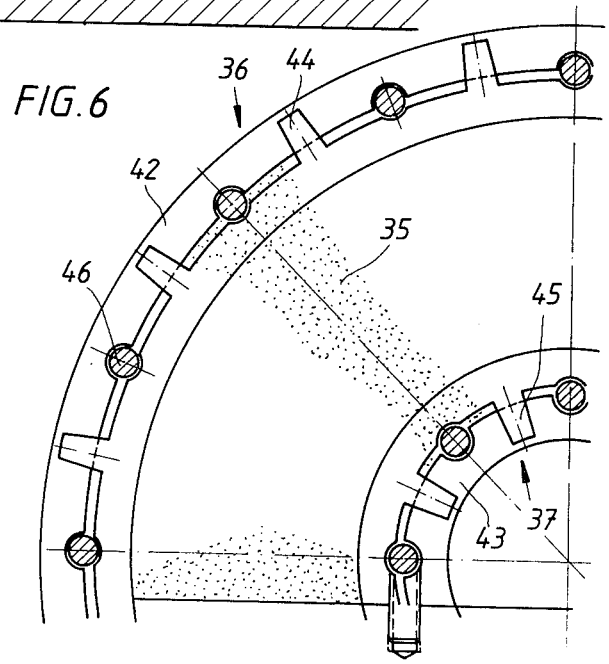
FIG. 6 is a horizontal sectional view taken through the concentric, annular gap strainers of FIG. 5.

As shown in FIGS. 5 and 6, strainers 36 and 37 respectively include rings 42 and 43 separated by spacers 44 and 45 and held in stacked relationship, respectively, by bolts 46. The thickness of the gaps between the stacked rings is designed to be somewhat smaller than the grain size of filter material 35. Thus, if metal wire clippings having a length of 0.4 mm and a diameter of 0.4 mm are used, spaces 44 and 45 would have a thickness of 0.2 mm.

In accordance with the filter design shown in FIG. 3, foul water to be cleaned flows from supply conduit 7 and into space 22 and from there to the interior of inlet portion 12 via the small inlet openings shown in the drawings. The foul water then flows into space 47 and down into intercommunicating annular gaps 48 and 50 (FIG. 5) which are formed between annular strainers 36 and the inner surfaces of sleeves 24 and 27. The water in gaps 48 and 50 flow radially through filter material 35 of both cartridges and into a central space 51 defined within inner annular strainers 37, then down into the bottom of lower chamber 23 and out through return conduit 8.

In the filter design according to FIG. 4, which is similar in many respects to FIG. 3, cartridges 10 and 11 respectively have lids 51,52 and bottom walls 53,54 having openings therein over which strainers 55,56 and 57,58 are respectively mounted. The cartridges contain filter material 60 in the spaces between the strainers. Lid 51 and bottom plate 53 are interconnected by a sleeve 61 spaced slightly inwardly of sleeve 24 so as to form an annular gap 62 therewith. Lid 52 and bottom wall 54 are interconnected by sleeve 27 and by an inner sleeve or tube 63 thus defining with sleeve 27 an annular space for filter material 60. Sleeve 63 defines a central axial channel 64, and another bottom wall 65 on sleeve 61 of cartridge 10 is provided with a depending sleeve 66 which fits within a muff 67 extending upwardly from sleeve 63 for interconnecting cartridges 10 and 11 together. Space 68 between bottom walls 53 and 65 is therefore in open communication with channel 64.

The foul water to be cleaned flows into chamber 22 via supply conduit 7 and from there flows into space 47 via inlet portion 12, all as in the same manner described with reference to FIG. 3. The foul water then flows along one path from space 47 through strainer 55 and axially through the bed of filter material 60 in cartridge 10 and then through strainer 56 and into space 68 and from there through channel 64 to chamber 23 and out through return conduit 8. Also, the foul water flows along another path from space 47 through annular gap 62 and into an annular space 69 located outwardly of muff 67 and from there it flows through strainer 57 and axially through the bed of filter material 60 in cartridge 11 and then through strainer 58 and into lower chamber 23 and out through return conduit 8.

It should be pointed out that sleeves 24 and 27 of the cartridges 10 and 11 are interconnected at the bottom and top thereof, respectively, in the same manner as that described with reference to FIG. 3, i.e., via bayonet-type connections. Also, the bottom of inlet portion 12 is interconnected with the top of sleeve 24 by means of the same bayonet-type connections described for FIG. 3, and the top of inlet portion 12 has a plate 31 thereon mounted to lid 6 by bolts 34 with coil springs 29 between plate 31 and the lid for resiliently urging the seal ring on cartridge 10 against shoulder 16 when the lid is mounted over the top opening of the filter housing, all as similarly described with reference to FIG. 3.

Obviously, many modifications and variations of the present invention are made possible in the light of the above teachings. For example, filter cartridges of different shapes containing different filter materials may be utilized as compared to that disclosed herein without departing from the invention. For example, the filter cartridges may be constructed as plane filters of different types. And, seal ring 20 may alternately be provided on inlet portion 12 at a suitable location for sealingly engaging with surface 17 so as to divide the filter housing into the two separate upper and lower chambers. It is therefore to be understood that within the scope of the appended claims the invention may be practiced otherwise than as specifically described.

What is claimed is:

1. A cartridge filter for separating radioactive contaminants from reactor cooling water used, for example, in nuclear power plants, comprising, at least one top opening filter housing having a supply conduit thereon for admitting cooling water to be filtered and a return conduit thereon for returning the filtered water, a lid covering said top opening, said housing having in its upper part an inwardly directed annular shoulder defining a valve seat, at least one removable filter cartridge containing filter material and being provided at its upper part with an outwardly directed supporting ring thereon in sealing engagement with said shoulder for carrying said filter cartridge freely suspended within said housing, said cartridge dividing said housing into two separate chambers respectively in communication with said supply and said return conduits, and said lid being interconnected with the filter cartridge so that by lifting said lid the cartridge is simultaneously lifted.

2. The filter according to claim 1, wherein a plurality of interconnected removable filter cartridges containing filter material are supported within said housing.

3. The filter according to claim 2, wherein said cartridges each include two concentric gap strainers defining an annular space therebetween, said filter material being located within each said space.

4. The filter according to claim 2, wherein said cartridges are each provided at inlet and outlet ends thereof with gap strainers defining an axial space therebetween, said filter material being located within each said space so that the cooling water to be filtered flows axially through said filter material.

5. The filter according to claims 3 or 4, wherein said filter material comprises wire clippings.

6. The filter according to claim 1 wherein a plurality of filter housings are provided and are interconnected as a filter group.

7. The filter according to claim 1, wherein spring means are provided between said lid and the filter housing for resiliently urging said ring against said shoulder when said lid is closed over said opening.

8. The filter according to claim 1, wherein the annular shoulder in the filter housing forming a valve seat is provided with an inwardly sloping conical seat surface.

9. The filter according to claim 8, wherein the supporting ring of said filter cartridge is provided with one of a conical and spherical surface cooperating with said valve seat surface of the annular shoulder in said filter housing.

* * * * *